United States Patent
Seo

(10) Patent No.: US 9,318,263 B2
(45) Date of Patent: Apr. 19, 2016

(54) MULTILAYER CERAMIC CAPACITOR HAVING A FLOATING ELECTRODE

(71) Applicant: SAMSUNG ELECTRO-MECHANICS CO., LTD., Suwon, Gyunggi-do (KR)

(72) Inventor: Byung Kil Seo, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 266 days.

(21) Appl. No.: 13/935,094

(22) Filed: Jul. 3, 2013

(65) Prior Publication Data

US 2014/0293500 A1    Oct. 2, 2014

(30) Foreign Application Priority Data

Mar. 29, 2013 (KR) .......................... 10-2013-0034273

(51) Int. Cl.
  *H01G 4/12* (2006.01)
  *H01G 4/30* (2006.01)
  *H01G 4/012* (2006.01)

(52) U.S. Cl.
  CPC ................. *H01G 4/12* (2013.01); *H01G 4/012* (2013.01); *H01G 4/30* (2013.01); *Y10T 29/435* (2015.01)

(58) Field of Classification Search
  CPC ............ H01G 4/12; H01G 4/30; H01G 4/012
  See application file for complete search history.

(56) References Cited

U.S. PATENT DOCUMENTS

| 4,247,881 | A | | 1/1981 | Coleman | |
| 4,513,350 | A | * | 4/1985 | Coleman | 361/321.2 |
| 6,052,272 | A | | 4/2000 | Kuroda | |
| 6,760,215 | B2 | | 7/2004 | Devoe | |
| 2007/0058326 | A1 | * | 3/2007 | Hidaka et al. | 361/311 |
| 2010/0033896 | A1 | * | 2/2010 | Togashi | 361/328 |
| 2010/0109804 | A1 | * | 5/2010 | Feichtinger | 333/172 |
| 2010/0220426 | A1 | | 9/2010 | Shimizu | |
| 2011/0056735 | A1 | | 3/2011 | Lee et al. | |
| 2013/0341082 | A1 | * | 12/2013 | Kuroda et al. | 174/527 |

FOREIGN PATENT DOCUMENTS

| JP | 08111344 | A | * | 4/1996 |
| JP | 2000012377 | A | * | 1/2000 |
| JP | 2002299149 | A | * | 10/2002 |
| JP | 4929487 | B2 | | 5/2012 |
| KR | 2011-0027321 | A | | 3/2011 |

* cited by examiner

*Primary Examiner* — David M Sinclair
(74) *Attorney, Agent, or Firm* — McDermott Will & Emery LLP

(57) ABSTRACT

There is provided a multilayer ceramic capacitor including a ceramic body including a plurality of dielectric layers, first and second external electrodes; first and second internal electrodes formed to be spaced apart from each other; and a first floating electrode disposed alternately with the first and second internal electrodes in the ceramic body in a thickness direction and having both end portions thereof overlapped with the first and second internal electrodes, respectively, wherein the first floating electrode is disposed so that a length of portion of the first internal electrode overlapped with one end portion of the first floating electrode and a length of portion of the second internal electrode overlapped with the other end portion of the first floating electrode in the ceramic body are different.

2 Claims, 9 Drawing Sheets

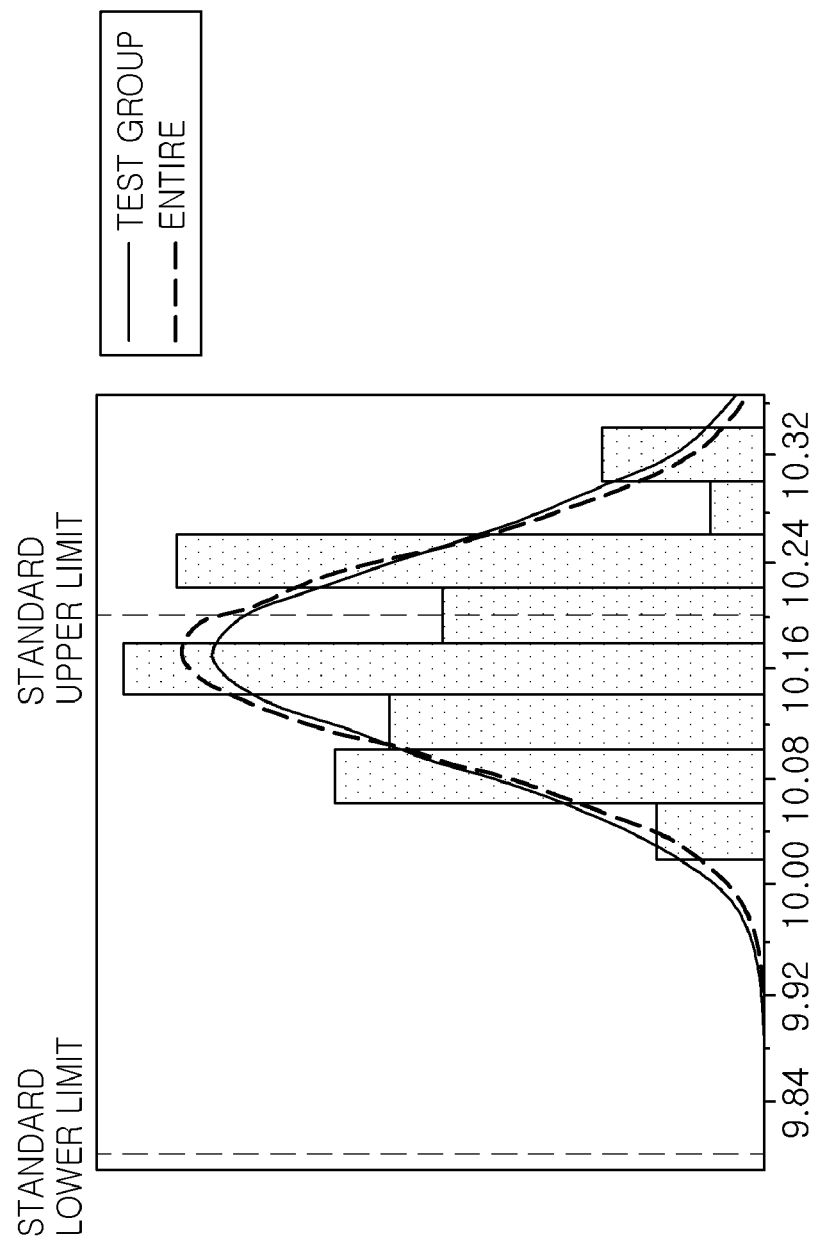

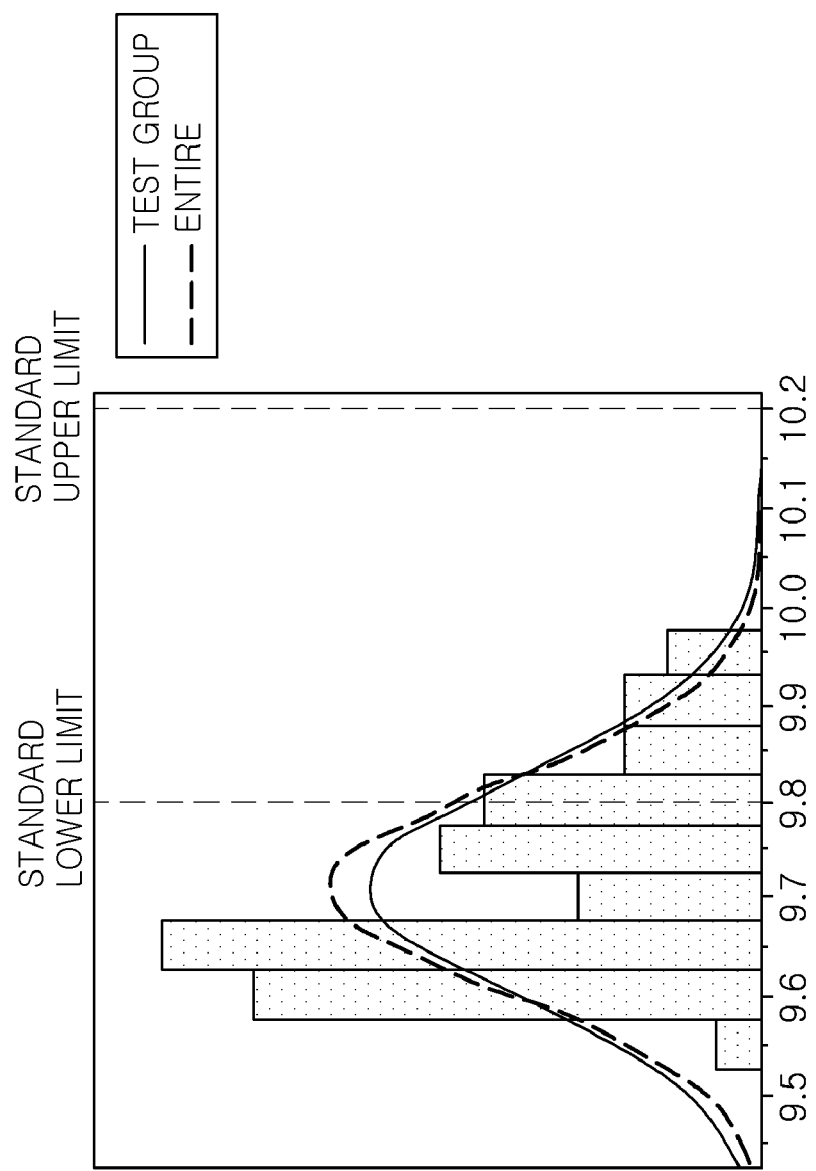

MULTILAYER CERAMIC CAPACITOR HAVING A FLOATING ELECTRODE

CROSS-REFERENCE TO RELATED APPLICATIONS

This application claims the priority of Korean Patent Application No. 10-2013-0034273 filed on Mar. 29, 2013, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same.

2. Description of the Related Art

Since a multilayer ceramic capacitor (MLCC), a multilayer chip electronic component, has advantages such as a small size, high capacitance, ease of mounting, such a multilayer ceramic capacitor may be used in various electronic devices.

For example, multilayer ceramic capacitors may be used as chip shaped condensers mounted on the printed circuit boards of various electronic products such as display devices, such as liquid crystal displays (LCDs), plasma display panels (PDPs), and the like, computers, personal digital assistants (PDAs), and mobile phones and may serve to charge electricity or discharge electricity.

Among multilayer ceramic capacitors, multilayer ceramic capacitors having high voltage and low capacitance characteristics exist. Generally, in multilayer ceramic capacitors having high voltage and low capacitance characteristics, in order to implement such characteristics, a design of an internal electrode structure using a floating electrode is mainly used.

For example, in a high voltage and low capacitance multilayer ceramic capacitor according to the related art, in the case in which relatively thick dielectric layers and fewer than 10 internal electrodes are stacked in plural to implement low capacitance, due to a design structure in which a floating electrode is fixed, a thickness of a sheet is changed in order to satisfy a capacitance value by inserting a buffer layer between the floating electrode and the internal electrode.

However, during the process as described above, capacitance values of a pre-processing test product and a post-processing product of the multilayer ceramic capacitor may be changed, such that product wastage may be high or product yield may be decreased. In addition, since the number of stacked layers is low, it may be not easy to secure connectivity of an external electrode, such that conductivity may be deteriorated, which may increase an equivalent series resistance (ESR) value.

First and second internal electrodes exposed to both end surfaces of a ceramic body and a floating electrode are disclosed in the following Related Art Document, but a configuration in which lengths of portions of the floating electrode overlapped with the first and second internal electrodes are different is not disclosed therein.

RELATED ART DOCUMENT

Japanese Patent No. 4929487

SUMMARY OF THE INVENTION

An aspect of the present invention provides a multilayer ceramic capacitor allowing for capacitance to be finely adjusted in an internal electrode design in which a floating electrode is used and high voltage and low capacitance characteristics are implemented, by adjusting lengths of overlapped portions between stacked floating electrodes and internal electrodes using an offset value while not increasing a thickness of a dielectric layer or the number of stacked internal electrode layers.

According to an aspect of the present invention, there is provided a multilayer ceramic capacitor including: a ceramic body including a plurality of dielectric layers stacked therein; first and second external electrodes formed on both end surfaces of the ceramic body; first and second internal electrodes formed to be spaced apart from each other on a common dielectric layer in the ceramic body so as to be exposed to both end surfaces of the ceramic body and electrically connected to the first and second external electrodes, respectively; and a first floating electrode disposed alternately with the first and second internal electrodes in the ceramic body in a thickness direction and having both end portions thereof overlapped with the first and second internal electrodes, respectively, wherein the first floating electrode is disposed so that a length of portion of the first internal electrode overlapped with one end portion of the first floating electrode and a length of portion of the second internal electrode overlapped with the other end portion of the first floating electrode in the ceramic body are different.

The multilayer ceramic capacitor may further include first and second dummy electrodes formed on the dielectric layer on which the first floating electrode is formed in the ceramic body so as to be exposed to both end surfaces of the ceramic body.

The multilayer ceramic capacitor may further include a second floating electrode formed on the dielectric layer on which the first and second internal electrodes are formed in the ceramic body so as to be spaced apart from the first and second internal electrodes.

The multilayer ceramic capacitor may further include first and second dummy electrodes formed on the dielectric layer on which the first floating electrode is formed in the ceramic body so as to be exposed to both end surfaces of the ceramic body; and a second floating electrode formed on the dielectric layer on which the first and second internal electrodes are formed in the ceramic body so as to be spaced apart from the first and second internal electrodes.

The second floating electrode may be overlapped with the first floating electrode.

According to an aspect of the present invention, there is provided a method of manufacturing a multilayer ceramic capacitor, the method including: forming a plurality of first and second conductive patterns on first and second ceramic sheets with a predetermined interval therebetween, respectively; alternately stacking the plurality of first and second ceramic sheets in a thickness direction so that both end portions of the second conductive pattern are overlapped with two first conductive patterns adjacent to each other, respectively, and compressing the plurality of first and second ceramic sheets in the thickness direction to prepare a multilayer body; cutting the multilayer body in regions corresponding to respective capacitors to form a plurality of capacitors and sintering the plurality of capacitors to manufacture ceramic bodies so that the cut two first conductive patterns become first and second internal electrodes exposed to both end surfaces of the multilayer body, respectively, and the cut second conductive pattern becomes a first floating electrode of which both end portions are overlapped with the first and second internal electrodes, respectively; and forming first and second external electrodes on both end surfaces of the ceramic body so as to be electrically connected to exposed portions of the first and second internal electrodes, wherein in the manufacturing of the multilayer body, the first and second ceramic sheets are disposed in the thickness direction so that lengths of overlapped portions between both end portions of the second conductive pattern and two first conductive patterns adjacent to each other are different from each other, and the disposed sheets are alternately stacked and compressed.

The forming of the conductive pattern may further include forming a third conductive pattern on the second ceramic sheet so as to be positioned between the second conductive patterns and have a length shorter than that of the second conductive pattern, and in the manufacturing of the ceramic body, the multilayer body may be cut so that two third conductive patterns disposed on both sides based on the second conductive pattern are exposed to both end surfaces of the multilayer body and form first and second dummy electrodes, respectively.

The forming of the conductive pattern may further include forming a fourth conductive pattern on the first ceramic sheet so as to be positioned between the first conductive patterns and to have a length shorter than that of the first conductive pattern, and in the manufacturing of the ceramic body, the fourth conductive pattern may form a second floating electrode overlapped with the first floating electrode.

The forming of the conductive pattern may further include forming a fourth conductive pattern on the first ceramic sheet so as to be positioned between the first conductive patterns and to have a length shorter than that of the first conductive pattern and forming a third conductive pattern on the second ceramic sheet so as to be positioned between the second conductive patterns and have a length shorter than that of the second conductive pattern, and in the manufacturing of the ceramic body, the multilayer body may be cut so that two third conductive patterns disposed on both sides based on the second conductive pattern are exposed to both end surfaces of the multilayer body and form first and second dummy electrodes, respectively, and the fourth conductive pattern may form a second floating electrode overlapped with the first floating electrode.

BRIEF DESCRIPTION OF THE DRAWINGS

The above and other aspects, features and other advantages of the present invention will be more clearly understood from the following detailed description taken in conjunction with the accompanying drawings, in which:

FIGS. 3A through 3C are graphs showing results obtained by comparing capacitance of a pre-processing test product and a post-processing product with each other in a structure in which lengths of portions of an existing floating electrode overlapped with first and second internal electrodes are the same as each other, as Comparative Examples;

FIG. 4A is a graph showing capacitance distribution at the time of pre-processing the multilayer ceramic capacitor according to the embodiment of the present invention;

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

Figure 1:
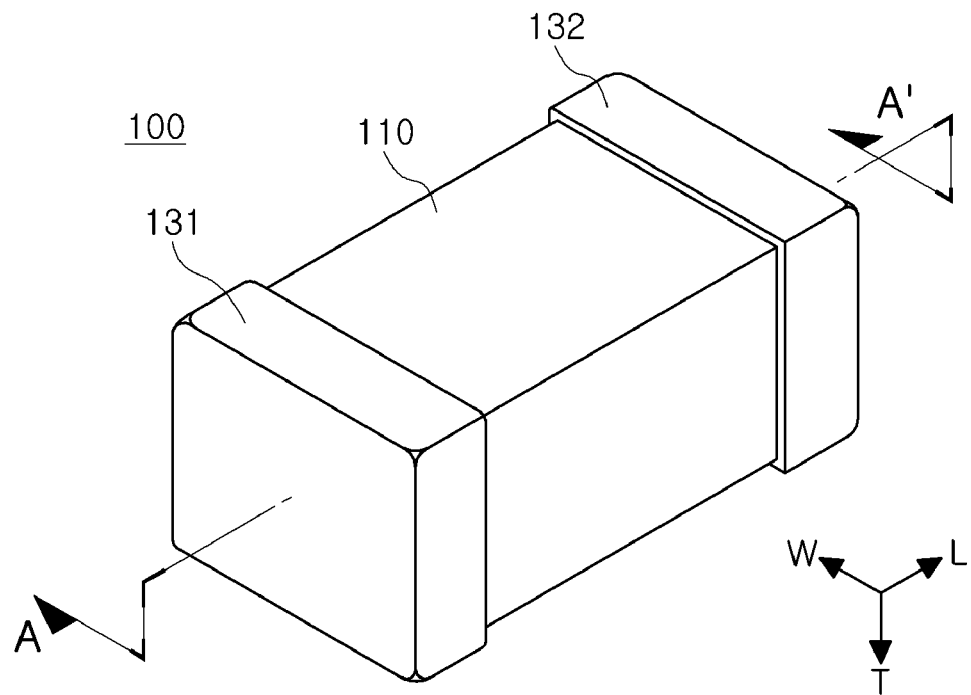
FIG. 1 is a perspective view schematically showing a multilayer ceramic capacitor according to an embodiment of the present invention.

In addition, defining directions in embodiments of the present invention, L, W, and T shown in FIG. 1 refer to a length direction, a width direction, and a thickness direction, respectively.

Multilayer Ceramic Capacitor

Figure 2:
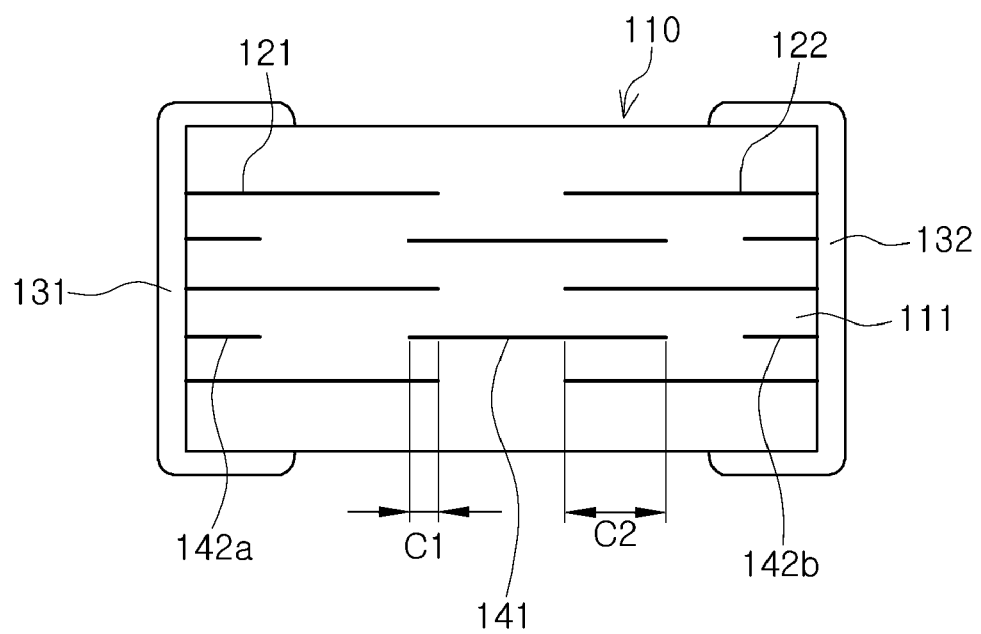
FIG. 2 is a cross-sectional view taken along line A-A' of FIG. 1.

FIG. 1 is a perspective view showing a multilayer ceramic capacitor 100 according to the embodiment of the present invention, and FIG. 2 is a cross-sectional view taken along line A-A' of FIG. 1.

Referring to FIGS. 1 and 2, the multilayer ceramic capacitor 100 according to the embodiment of the present invention may include a ceramic body 110 including a plurality of dielectric layers 111 stacked therein, a plurality of first and second internal electrodes 121 and 122, a first floating electrode 141, and first and second external electrodes 131 and 132 electrically connected to the first and second internal electrodes 121 and 122, respectively.

The ceramic body 110 may be formed by stacking the plurality of ceramic dielectric layers 111 in the thickness direction and then sintering the plurality of ceramic dielectric layers 111, wherein the dielectric layers 111 may be integrated such that boundaries therebetween may not be readily apparent. Here, the ceramic body 110 may have a hexahedral shape.

In the present embodiment, the ceramic body 110 may be manufactured so as to have a relatively large size (for example, length×width≥16 mm×8 mm), such that high voltage and low capacitance characteristics may be implemented therein, but the present invention is not limited thereto.

The dielectric layer 111 may contain a ceramic material having a high degree of permittivity, for example, barium titanate ($BaTiO_3$) based ceramic powder, or the like, but the present invention is not limited thereto as long as sufficient capacitance may be obtained.

In addition, the dielectric layer 111 may further contain various ceramic additives such as transition metal oxides or carbides, a rare earth element, magnesium (Mg), aluminum (Al), or the like, an organic solvent, a plasticizer, a binder, a dispersant, or the like, in addition to the ceramic powder, as needed.

Referring to FIG. 2, in a length-thickness cross-section of the multilayer ceramic capacitor 100, a portion at which the first and second internal electrodes 121 and 122 are not formed may be defined as a margin part.

In this case, among the margin parts, margin parts positioned at upper and lower end portion of the ceramic body 110 in the thickness direction may be fined as upper and lower cover layers.

The upper and lower cover layers may be formed by sintering a plurality of ceramic sheets similarly to the dielectric layer 111 including the first and second internal electrodes 121 and 122 formed thereon and have a similar structure to that of dielectric layers 111 positioned in a center of the ceramic body 110 except that the internal electrode is not formed therein.

In addition, the first and second external electrodes 131 and 132 may be formed on both end surfaces of the ceramic body 110 so as to cover the plurality of first and second internal electrodes 121 and 122 exposed to both end surfaces to thereby be electrically connected to the first and second internal electrodes 121 and 122, respectively.

The first and second external electrodes 131 and 132 as described above may be formed of a conductive metal, for example, at least one of silver (Ag), lead (Pb), platinum (Pt), nickel (Ni), and copper (Cu), an alloy thereof, or the like, but the present invention is not limited thereto.

Meanwhile, first and second plating layers (not shown) may be formed on the first and second external electrodes 131 and 132, as needed.

The first and second plating layers may include a nickel (Ni) plating layer formed on the first and second external electrodes 131 and 132 and a tin (Sn) plating layer formed on the nickel plating layer.

The first and second plating layers as described above is to increase adhesion strength between the multilayer ceramic capacitor 100 and a printed circuit board at the time of mounting the multilayer ceramic capacitor 100 on the printed circuit board, or the like, by solder. The plating may be performed by a method known in the art, and lead-free plating may be performed in consideration of environmental friendliness, but the present invention is not limited thereto.

The first and second internal electrodes 121 and 122, which are electrodes having different polarities, may be simultaneously formed so as to be spaced apart from each other on at least one surface of the ceramic sheet forming the dielectric layer 111 and be formed in the ceramic body 110 so as to be exposed to both end surfaces of the ceramic body 110, respectively.

As described above, the first and second internal electrodes 121 and 122 exposed to both end surfaces of the ceramic body 110, respectively, may be electrically connected to the first and second external electrodes 131 and 132, respectively.

In addition, the first and second internal electrodes 121 and 122 may be formed of a conductive metal, for example, at least one of silver (Ag), lead (Pb), platinum (Pt), nickel (Ni), and copper (Cu), an alloy thereof, or the like, but the present invention is not limited thereto.

The first floating electrode 141 may be disposed in the ceramic body 110 alternately with the first and second internal electrodes 121 and 122 in the thickness direction, and predetermined portions of both end portions thereof are overlapped with end portions of the first and second internal electrodes 121 and 122 spaced apart from each other, respectively.

In this case, the floating electrode 141 may be disposed in the ceramic body 110 so that a length C1 of an overlapped portion between the first internal electrode 121 and one end portion of the first floating electrode 141 and a length C2 of an overlapped portion between the second internal electrode 122 and the other end portion of the first floating electrode 141 are different.

Although the case in which C2 is longer than C1 is described in the present embodiment, the present invention is not limited thereto. For example, the first floating electrode 141 may be formed so that C1 is longer than C2, as needed.

The following Table 1 shows a decreasing rate of capacitance according to the changes of C1 and C2. Here, the decreasing rate of capacitance $C_{(1L)}$ may be calculated by (C1×C2)/(C1+C2). In this case, the number of stacked first and second internal electrodes may be based on an odd number.

TABLE 1

| Sample | C1 | C2 | Decreasing rate of capacitance |
|---|---|---|---|
| 1 | 0.38 | 0.38 | 0% |
| 2 | 0.3 | 0.46 | 4.4% |
| 3 | 0.25 | 0.51 | 11.7% |
| 4 | 0.2 | 0.56 | 22.4% |
| 5 | 0.15 | 0.61 | 36.6% |
| 6 | 0.1 | 0.66 | 54.3% |
| 7 | 0.05 | 0.71 | 75.4% |

Referring to Table 1, it may be confirmed that in the case of sample 1 having a symmetrical structure in which C2 was the same as C1, a decreased rate of capacitance was 0%, the benchmark, and in the cases of samples 2 through 7, the larger the difference between C2 and C1, the larger the decrease in the rate of capacitance thereof.

Meanwhile, first and second dummy electrodes 142a and 142b may be formed on the dielectric layer 111 on which the first floating electrode 141 is formed in the ceramic body 110 so as to be exposed to both end surfaces of the ceramic body 110, respectively, and so as to face each other, having the first floating electrode 141 therebetween.

As described above, end portions of the first and second dummy electrodes 142a and 142b exposed to both end surfaces of the ceramic body 110, respectively, may be electrically connected to the first and second external electrodes 131 and 132, respectively.

Figure 3A:
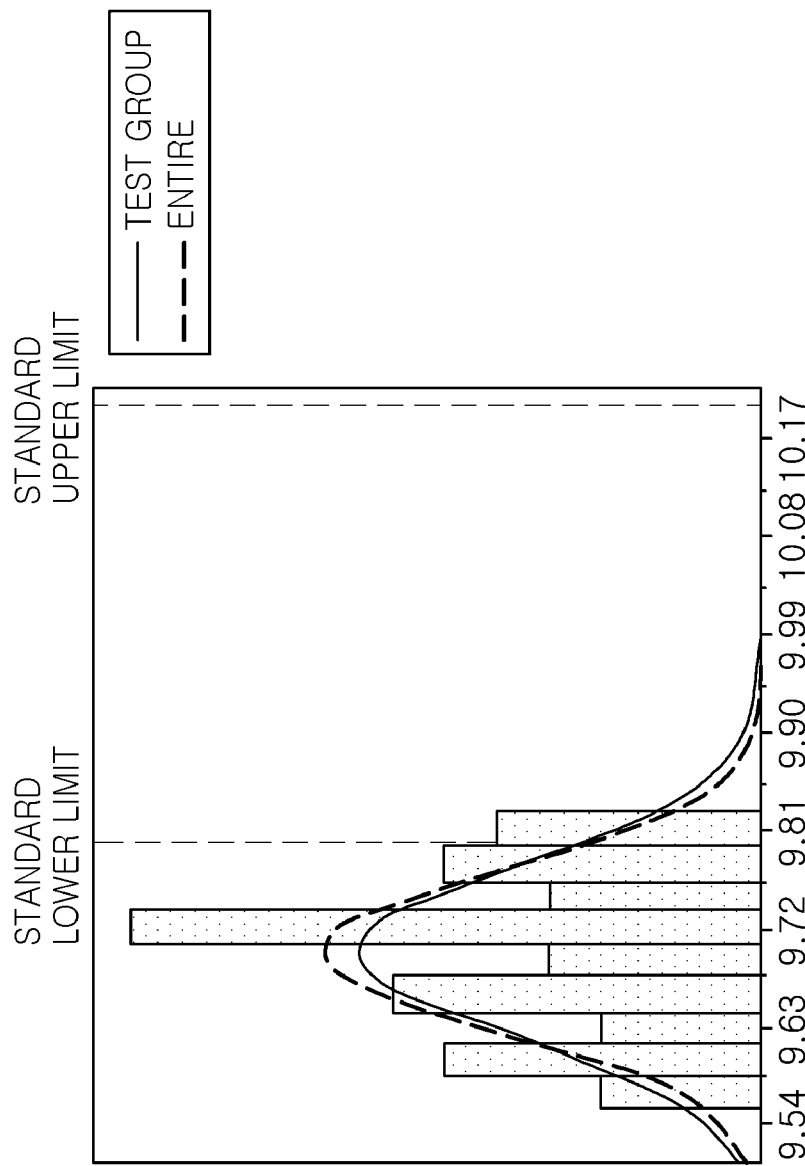
Figure 3B:
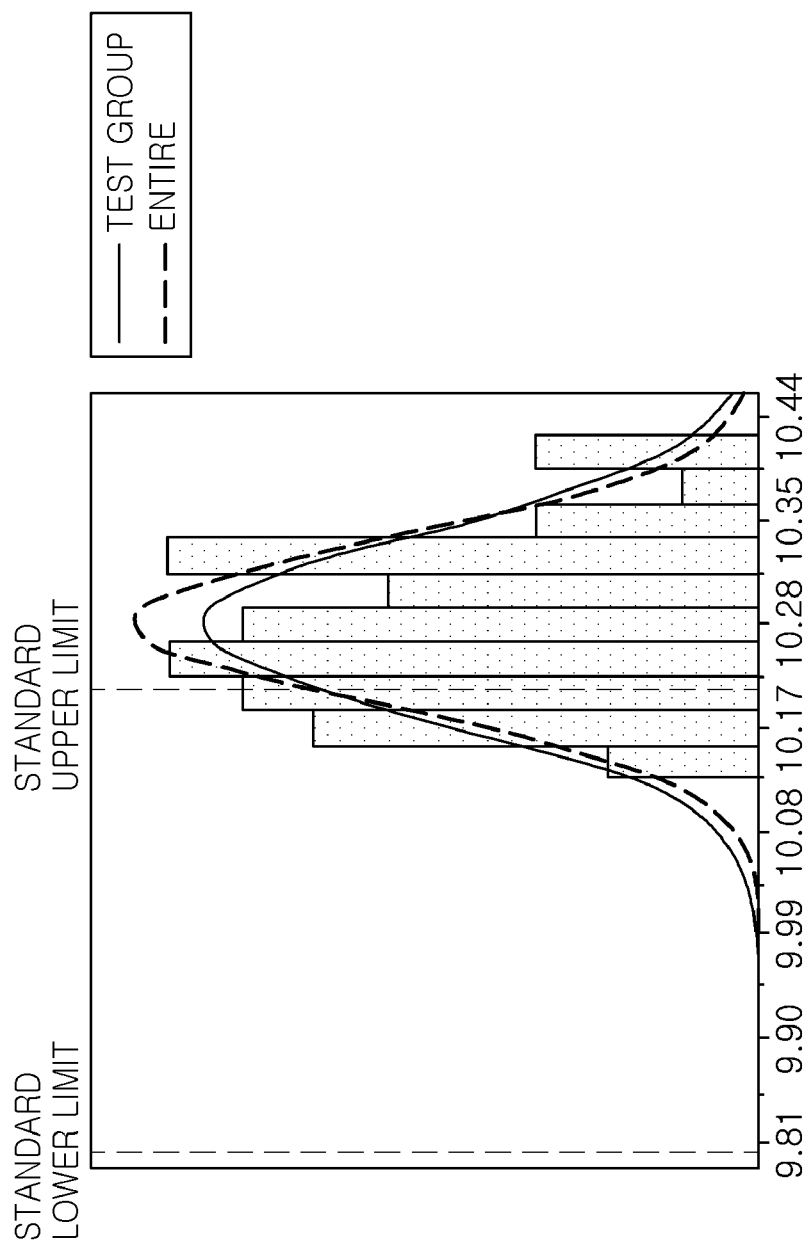

FIGS. 3A through 3C are graphs showing results obtained by comparing capacitance of a pre-processing test product and a post-processing product with each other in a structure in which lengths of portions of an existing floating electrode overlapped with first and second internal electrodes are the same as each other, as Comparative Examples.

Here, the terms "pre-processing" and "post-processing" indicate that in order to satisfy the necessary capacitance at the time of manufacturing the multilayer ceramic capacitor, one bar is pre-processed, and then a changed capacitance value is re-designed.

Generally, in the case of a high capacitance multilayer ceramic capacitor, the capacitance value may be satisfied by increasing or decreasing the number of stacked internal electrodes, but in the case of a low capacitance multilayer ceramic capacitor, the capacitance value may be decreased by inserting a buffer layer having a predetermined thickness to thicken a thickness of one layer of the dielectric layer.

FIG. 3A shows process capability (capacitance distribution) in the case in which the buffer layer was not formed, FIG. 3B shows process capability (capacitance distribution) in the case in which a buffer layer having a thickness of 10 μM was inserted, and FIG. 3C shows process capability (capacitance distribution) in the case in which a buffer layer having a thickness of 20 μM was inserted.

Here, each of the dielectric layers had a thickness of 28 μM, the number of stacked internal electrode layers was 15, and each of the upper and lower cover layers was set to have a thickness of 15 μM.

An offset value was 0.9 mm, and both of C1 and C2 were 0.38 mm.

As a result, it may be confirmed that in the case of FIG. 3A in which the buffer layer was not formed, average capacitance was 10.39 pF and a capacitance defect was partially shown, in the case of FIG. 3B in which the buffer layer having a thickness of 10 μm was inserted, average capacitance was 10.20 pF, in the case of FIG. 3C in which the buffer layer having a thickness of 20 μm was inserted, average capacitance was 10.10 pF, and in both of the cases of FIGS. 3B and 3C, yields were decreased.

Figure 4B:
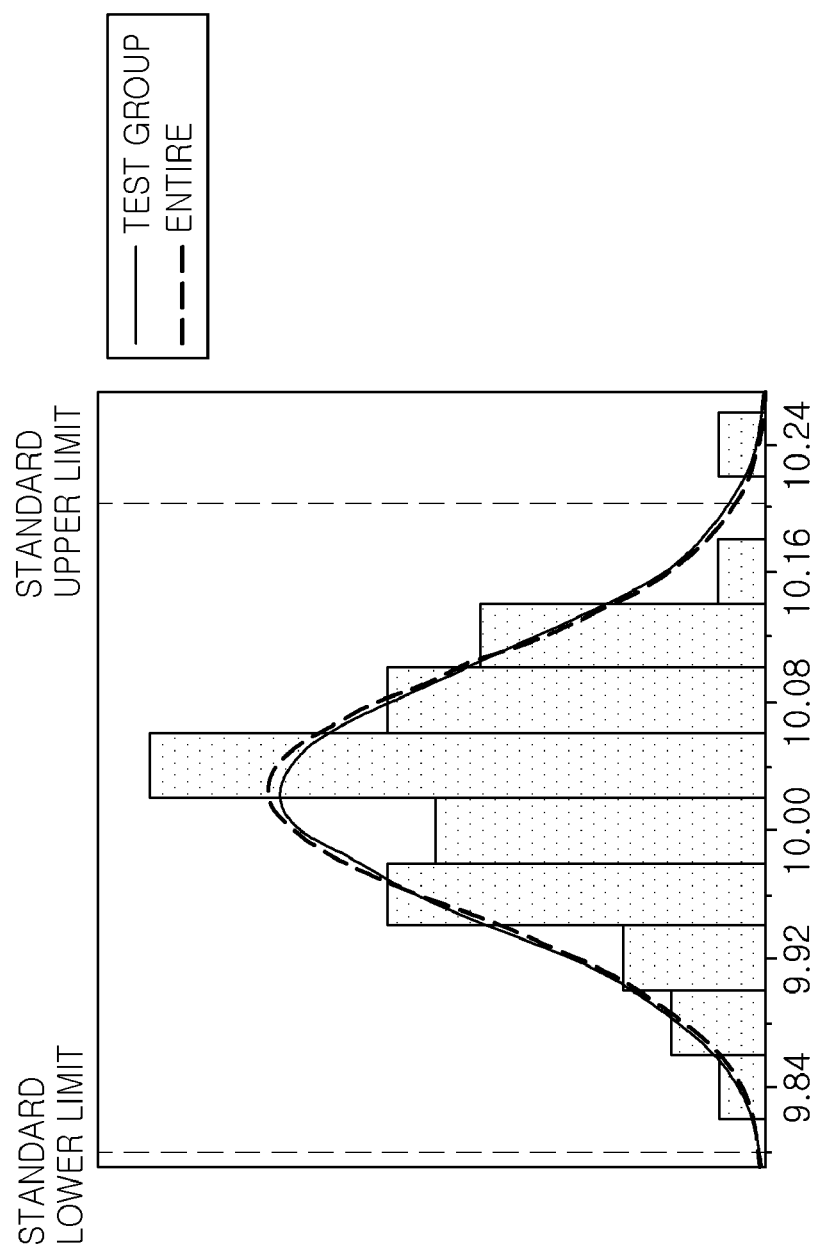
FIG. 4B is a graph showing capacitance distribution at the time of post-processing the multilayer ceramic capacitor according to the embodiment of the present invention.

FIG. 4A is a graph showing capacitance distribution at the time of pre-processing the multilayer ceramic capacitor according to the embodiment of the present invention, and FIG. 4B is a graph showing capacitance distribution at the time of post-processing the multilayer ceramic capacitor according to the embodiment of the present invention.

Here, a thickness of each of the dielectric layers was set as 22 μm, the number of stacked internal electrode layers was set as 17, and a thickness of each of the upper and lower cover layers was set as 108 μm.

In the case of the pre-processing test product of FIG. 4A, an offset value was set as 1.350, C1 was set as 0.155, and C2 was set as 0.605. Further, in the case of the post-processing product of FIG. 4B, an offset value was set as 1.336, C1 was set as 0.162, and C2 was set as 0.598.

As a result, in the pre-processing test product of FIG. 4A, average capacitance was 9.7 pF, and in the post-processing product of FIG. 4B, average capacitance was 10.02 pF. Therefore, it may be confirmed that the average capacitance was decreased as compared with Comparative Examples according to the related art shown in FIGS. 3A through 3C.

Further, in Comparative Examples, a cover sheet was used as the buffer layer. In this case, the capacitance value was satisfied at some degree, but as a thickness design used at the time of pre-processing was changed, it was difficult to exactly satisfy the necessary capacitance value.

On the other hand, in the case of the present embodiment, the necessary capacitance value may be satisfied only by changing the offset value of the overlap portion while not changing the thickness of the sheet so as to use a thickness design equal to that of the pre-processing test product.

Figure 5:
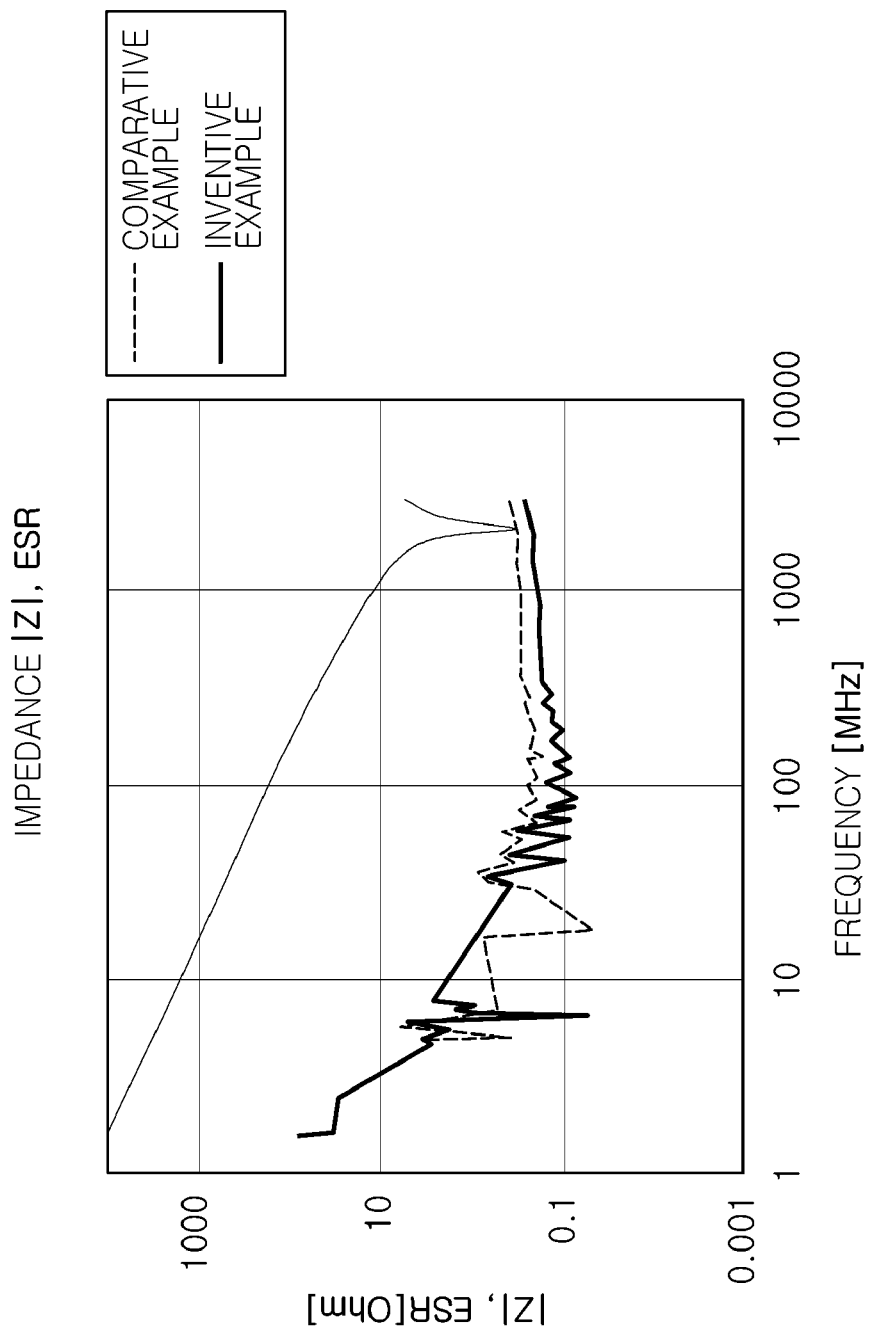
FIG. 5 is a graph showing results obtained by comparing ESR values in the case in which first and second dummy electrodes are not formed in a ceramic body (Comparative Example) and in the case in which first and second dummy electrodes are formed in a ceramic body.

Meanwhile, FIG. 5 is a graph illustrating results obtained by comparing ESR values in the case in which the first and second dummy electrodes 142a and 142b are not formed in the ceramic body 110 (Comparative Example) and in the case in which the first and second dummy electrodes 142a and 142b are formed in the ceramic body 110.

Referring to FIG. 5, it may be confirmed that in Comparative Example in which the first and second dummy electrodes 142a and 142b were not present, a contact problem between the first and second internal electrodes 121 and 122 and the first and second external electrodes 131 and 132 was generated, such that the ESR was relatively high, but in Inventive Example in which the first and second dummy electrodes 142a and 142b were formed, the contact between the first and second internal electrodes 121 and 122 and the first and second external electrodes 131 and 132 was improved, such that the ESR was decreased.

Method of Manufacturing a Multilayer Ceramic Capacitor

Figure 6A:
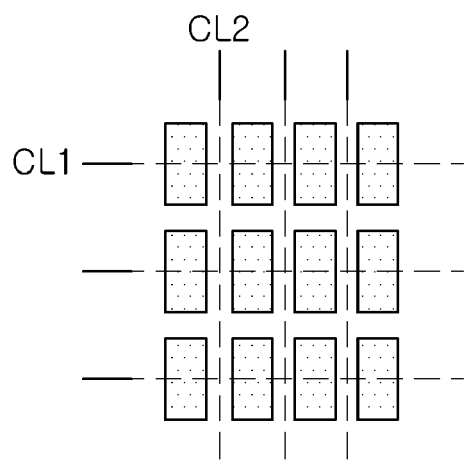
FIG. 6A is a plan view schematically showing a state in which a plurality of first electrode patterns are formed on a first ceramic sheet in a method of manufacturing a multilayer ceramic capacitor according to another embodiment of the present invention.
Figure 6B:
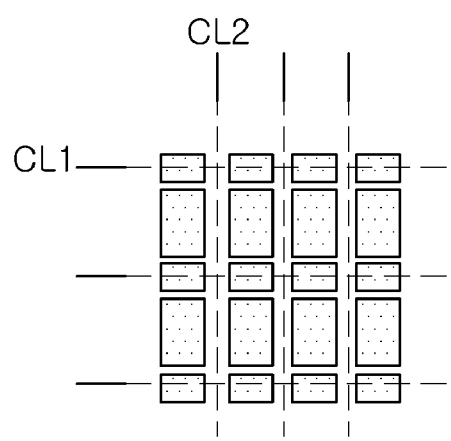
FIG. 6B is a plan view schematically showing a state in which a plurality of second and third electrode patterns are formed on a second ceramic sheet in the method of manufacturing a multilayer ceramic capacitor according to another embodiment of the present invention.

FIG. 6A is a plan view schematically showing a state in which a plurality of first electrode patterns are formed on a first ceramic sheet in a method of manufacturing a multilayer ceramic capacitor according to another embodiment of the present invention, and FIG. 6B is a plan view schematically showing a state in which a plurality of second and third electrode patterns are formed on a second ceramic sheet in the method of manufacturing a multilayer ceramic capacitor according to another embodiment of the present invention.

Hereinafter, the method of manufacturing a multilayer ceramic capacitor according to the embodiment of the present invention will be described with reference to FIGS. 6A and 6B.

First, a plurality of first and second ceramic sheets may be prepared.

The first and second ceramic sheets, provided to form a dielectric layer 111 of a ceramic body 110, may be manufactured as a sheet having a thickness of several μm by mixing ceramic powder, a polymer, and a solvent to prepare a slurry, applying the prepared slurry to a carrier film by a doctor blade method, or the like, and drying the applied slurry.

Next, a conductive paste may be printed on one surface of the first ceramic sheet at a predetermined thickness to form a plurality of first conductive patterns in the length direction, having a predetermined interval therebetween, and the conductive paste may be printed on one surface of the second ceramic sheet at a predetermined thickness to form a plurality of second conductive patterns in the length direction, having a predetermined interval therebetween.

In this case, the interval between the second conductive patterns adjacent to each other may be wider than the interval between the first conductive patterns adjacent to each other.

In addition, as a method of printing the conductive paste for forming the first and second conductive patterns, a screen printing method, a gravure printing method, or the like, may be used, but the present invention is not limited thereto.

Meanwhile, as needed, a fourth conductive pattern may be further formed on the first ceramic sheet so as to be positioned between the first conductive patterns and to have a length shorter than that of the first conductive pattern.

In addition, as needed, a third conductive pattern may be further formed on the second ceramic sheet so as to be positioned between the second conductive patterns and have a length shorter than that of the second conductive pattern.

Thereafter, the plurality of first and second ceramic sheets may be alternately stacked in the thickness direction so that both end portions of the second conductive pattern are overlapped with two first conductive patterns adjacent to each other, respectively, and compressed in a stacking direction, thereby preparing a multilayer body.

In this case, the multilayer body may be prepared by disposing the first and second ceramic sheets in the thickness direction so that lengths of overlapped portions between both end portions of the second conductive pattern and two first conductive patterns adjacent to each other are different from each other, alternately stacking the disposed sheets, and then compressing the stacked sheets.

Next, the multilayer body may be cut in regions corresponding to respective capacitors to form a plurality of capacitors along cutting lines CL1 and CL2, followed by sintering, thereby manufacturing the ceramic body 110 so that the cut two first conductive patterns become first and second internal electrodes 121 and 122 exposed to both end surfaces of the multilayer body, respectively, and the cut second conductive pattern becomes a first floating electrode 141 of which both end portions are overlapped with the first and second internal electrodes 121 and 122, respectively.

Here, in the case in which the fourth or third conductive pattern is formed on the first and second ceramic sheets, respectively, when the multilayer body is cut, two third conductive patterns disposed on both sides based on the second conductive pattern may be exposed to both end surface of the multilayer body and become first and second dummy electrodes, and the fourth conductive pattern may become a second floating electrode overlapped with the first floating electrode.

Next, first and second external electrodes 131 and 132 may be formed on both end surfaces of the ceramic body 110, respectively, so as to be electrically connected to exposed portions of the first internal electrode 121 and the second internal electrode 122.

In this case, as needed, first and second plating layers (not shown) may be formed by plating surfaces of the first and second external electrodes 131 and 132 using an electroplating method, or the like, after the forming of the first and second external electrodes 131 and 132.

As a material used in the plating, nickel, tin, a nickel-tin alloy, or the like, may be used, but the present invention is not limited thereto.

Further, as needed, the first and second plating layers may be formed by sequentially stacking a nickel plating layer and a tin plating layer on the surfaces of the first and second external electrodes 131 and 132.

MODIFICATION EXAMPLE

Figure 7:
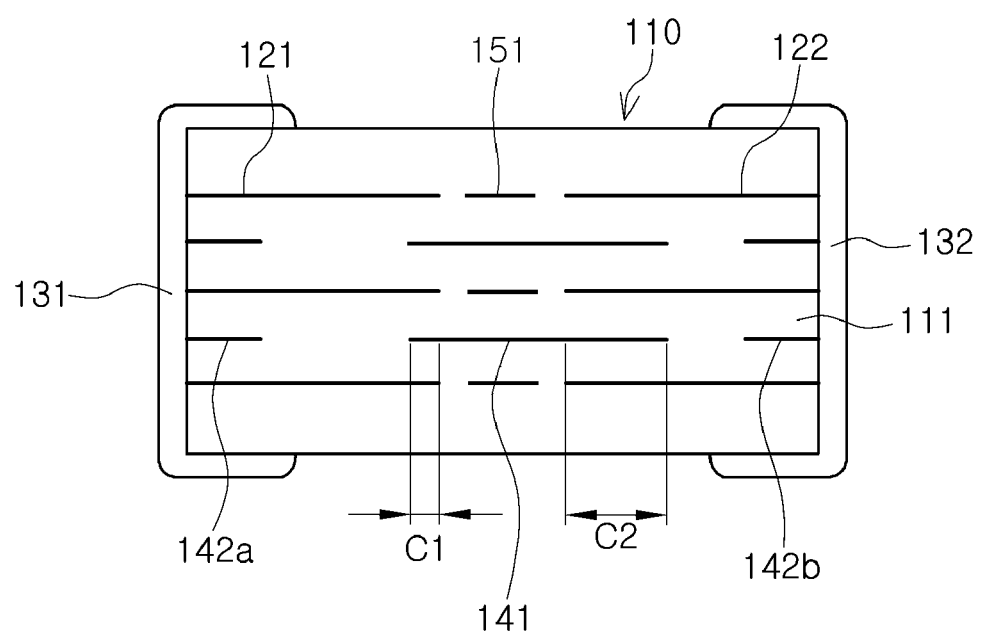
FIG. 7 is a side cross-sectional view schematically showing a structure of an internal electrode of a multilayer ceramic capacitor according to another embodiment of the present invention.

FIG. 7 is a side cross-sectional view schematically showing a structure of an internal electrode of a multilayer ceramic capacitor according to another embodiment of the present invention.

Since a structure in which a ceramic body 110, first and second internal electrodes 121 and 122, a first floating electrode 141, and first and second dummy electrodes 142a and 142b are formed is the same as that in the above-mentioned embodiment, a detailed description thereof will be omitted in order to avoid an overlapped description. Here, a second floating electrode 151 having a structure different from that in the above-mentioned embodiment as shown in FIG. 7 will be described in detail.

Referring to FIG. 7, the second floating electrode 151 may be formed in the ceramic body 110 so as to be spaced apart from first and second internal electrodes 121 and 122 on the dielectric layer 111 on which the first and second internal electrodes 121 and 122 are formed.

In this case, the second floating electrode 151 may be overlapped with upper and lower first floating electrodes 141.

As set forth above, according to the embodiment of the present invention, in an internal electrode design in which the floating electrode is used and high voltage and low capacitance characteristics are implemented, the capacitance of the multilayer ceramic capacitor may be finely adjusted by differently adjusting the lengths of the overlapped portions between both end portions of the first floating electrode and the first and second internal electrodes by using the offset value, while not increasing the thickness of the dielectric layer or the number of stacked internal electrode layers.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body including a plurality of dielectric layers stacked therein;
   first and second external electrodes formed on both end surfaces of the ceramic body;
   first and second internal electrodes formed to be spaced apart from each other on a common dielectric layer in the ceramic body so as to be exposed to both end surfaces of the ceramic body and electrically connected to the first and second external electrodes, respectively;
   a first floating electrode disposed alternately with the first and second internal electrodes in the ceramic body in a thickness direction and having both end portions thereof overlapped with the first and second internal electrodes, respectively; and
   a second floating electrode disposed on dielectric layers on which the first and second internal electrodes are formed in the ceramic body so as to be spaced apart from the first and second internal electrodes,
   wherein the first floating electrode is disposed so that a length of a portion of the first internal electrode overlapped with one end portion of the first floating electrode and a length of a portion of the second internal electrode overlapped with the other end portion of the first floating electrode in the ceramic body are different, and
   wherein the first floating electrode is formed on a single dielectric layer, and the first floating electrode is overlapped with the entirety of the second floating electrode.

2. The multilayer ceramic capacitor of claim 1, further comprising first and second dummy electrodes formed on the dielectric layer on which the first floating electrode is formed in the ceramic body so as to be exposed to both end surfaces of the ceramic body.

* * * * *